(12) United States Patent
Laye et al.

(10) Patent No.: US 7,709,037 B2
(45) Date of Patent: May 4, 2010

(54) PROCESS CHEESE CONTAINING INCREASED LEVELS OF WHEY PROTEIN

(75) Inventors: Isabelle Laye, Wheeling, IL (US); Ted Riley Lindstrom, Lake Forest, IL (US); Leslie Lowry, Prairie View, IL (US); Fu-I Mei, Wheeling, IL (US); Matthew Zwolfer, Chicago, IL (US); Omar Diaz-Castillo, Chicago, IL (US); Jordan Dolande, Crystal Lake, IL (US); Steven Havlik, South Elgin, IL (US); Vladimir Rueda, Chicago, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 0 days.

(21) Appl. No.: 10/694,960

(22) Filed: Oct. 28, 2003

(65) Prior Publication Data
US 2004/0126473 A1   Jul. 1, 2004

Related U.S. Application Data

(62) Division of application No. 09/882,231, filed on Jun. 15, 2001, now Pat. No. 6,669,978.

(51) Int. Cl.
   *A23C 19/00*   (2006.01)
(52) U.S. Cl. .................... 426/582; 426/34; 426/36; 426/39; 426/580; 426/657
(58) Field of Classification Search .................... 426/34, 426/36, 39, 40, 41, 519, 580, 582, 656, 657
See application file for complete search history.

(56) References Cited

U.S. PATENT DOCUMENTS

| 4,166,142 A | 8/1979 | Chang |
| 4,518,616 A | 5/1985 | Czulak |
| 5,356,639 A | 10/1994 | Jameson et al. |
| 5,750,177 A | 5/1998 | Yee et al. |

FOREIGN PATENT DOCUMENTS

CA   2 139 925 C   12/1998

OTHER PUBLICATIONS

Gupta, VK, and H. Reuter. "Processed Cheese Foods with Added Whey Protein Concentrated." *Lait* 72(1992:201-212).
Morr, C.V., B. German, J.E. Kinsella, J.M. Regenstein, J.P. Van Buren, A. Kilara, B.A. Lewis, and M.E. Mangino. "A Collaborative Study to Develop a Standardized Food Protein Solubility Procedure." *Journal of Food Science* 50(1985):1715-1718.
V. K. Gupta and H. Reuter, "Processed Cheese Foods With Added Whey Protein Concentrates," Lait, vol. 72, 1992, pp. 201-212.

*Primary Examiner*—Leslie Wong
(74) *Attorney, Agent, or Firm*—Fitch, Even, Tabin & Flannery

(57) ABSTRACT

The present invention provides process cheeses comprising casein and whey protein with a ratio of casein to whey protein of from about 50:50 to about 75:25. Typically, the process cheese further comprises an emulsifier, milkfat, and may contain one or more other ingredients such as, but not limited to, whole whey, cheese, and lactic acid. The present invention provides methods for producing the process cheese of the current invention using a pre-cook or post-cook homogenization step, and/or a modified dairy protein source. The modified dairy protein source includes high viscosity whey protein, emulsified high fat whey protein powder, low calcium whey protein, and/or high solubility milk protein.

10 Claims, 3 Drawing Sheets

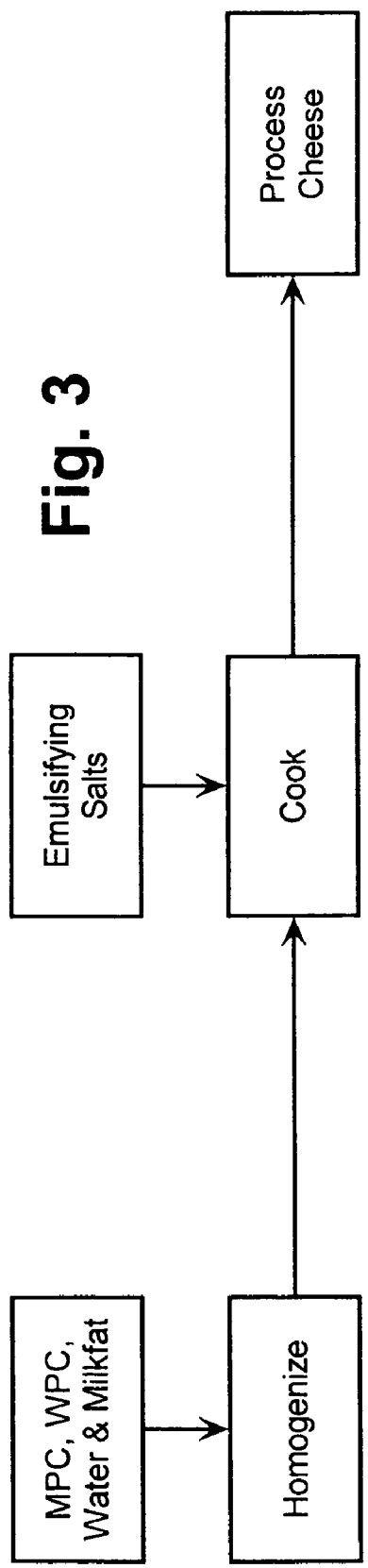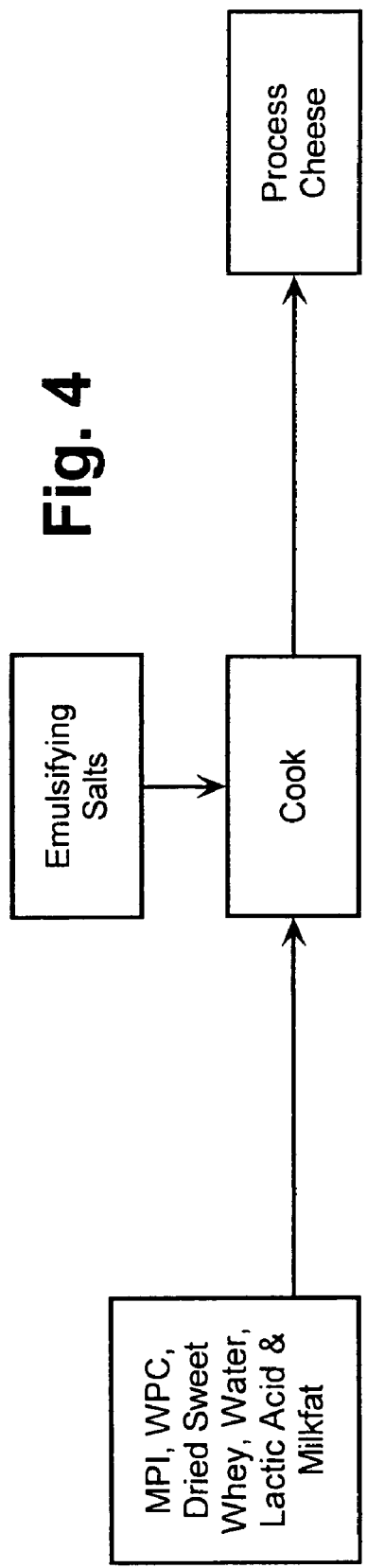

PROCESS CHEESE CONTAINING INCREASED LEVELS OF WHEY PROTEIN

This is a division of prior application Ser. No. 09/882,231, filed Jun. 15, 2001, now U.S. Pat. No. 6,669,978, which is hereby incorporated herein by reference in its entirety.

FIELD OF THE INVENTION

The invention relates to process cheese and its production. More specifically, the invention relates to process cheeses with increased whey protein concentration and to methods for producing these process cheeses. This invention also relates to process cheeses having casein to whey ratios of less than about 3:1 and which retain acceptable firmness and to methods for producing these process cheeses. Generally, the process cheeses of this invention have a penetrometer firmness of about 10 to about 20 mm and a softening or melting point of about 105 to about 150° F.

BACKGROUND

Conventional processes for making natural and processed cheese essentially utilize only casein. Generally only a few percent of whey proteins are incorporated into such cheeses since the majority of whey protein is retained in the whey and discarded as a by-product of conventional cheese-making processes. Whey proteins comprise about 14 to 24 weight percent of whole or skim milk's proteins and have a nutritional value at least comparable to that of casein. Therefore, the loss of whey proteins in conventional cheese making processes represents a costly inefficiency in these processes. The utilization of even a portion of whey proteins in the manufacture of natural and processed cheeses is of great commercial importance.

Therefore, attempts have been made to design processes which incorporate increased amounts of whey into these natural and process cheeses. However, processed cheese formulas with casein/whey protein ratios below about 3:1 give unacceptable textural characteristics (commonly expressed as "soft body"). Therefore, there remains a need for process cheeses with increased whey, which retain acceptable firmness, even with a casein to whey ratio of less than about 3:1.

Yee et al. (U.S. Pat. No. 5,750,177) describe natural cheeses with increased-whey protein having casein:whey ratios of 16:1 to 4:1 made from ultrafiltered cheese. The cheeses of Yee et al. require labor, time, and equipment-intensive ultrafiltered cheese, and result in cheese that has a whey protein:casein ratio that is no greater than that of the starting milk.

Czulak et al. (U.S. Pat. No. 4,518,616) describe methods for increasing the amount of whey protein incorporated into a natural cheese by ultra-filtering whey to form a whey protein concentrate, mixing the whey protein concentrate with milk to form an enriched milk, and then ultrafiltering the enriched milk, either before or after curding of the milk using lactic starter cultures, rennet, or combinations thereof.

The current invention provides formulations of process cheeses with casein/whey protein ratios below about 3:1 that retain a desirable firmness. The ratio of casein proteins to whey proteins in the process cheese of this invention preferably ranges from about 50:50 to about 75:25 (i.e., about 1:1 to about 3:1) as measured by gel electrophoresis. This provides major potential cost savings by allowing replacement of casein by whey proteins and/or supplementation of casein with whey proteins in a processed cheese product.

SUMMARY OF THE INVENTION

As discussed above, process cheese manufactured today generally contains only a limited amount of whey protein (i.e., less than about 25 percent whey protein relative to total protein). The current invention provides rule breaking cheeses and processes which increase the whey protein content of processed cheese (i.e., casein/whey protein ratio less than about 3:1) with controlled firmness and good melting characteristics. Generally, the process cheeses of this invention have a penetrometer firmness of about 10 to about 20 mm and a softening or melting point of about 105 to about 150° F. More preferably, the process cheeses of this invention have a penetrometer firmness of about 12 to about 18 mm and a softening or melting point of about 110 to about 150° F. Prior to this invention, increasing the whey protein to greater than about 25 percent of the total protein in process cheese could not be achieved without loss of consumer expected firmness and meltability. The current invention provides a firm, good melting process cheese having a protein composition (i.e., casein/whey protein ratio less than about 3:1) that has not previously been achieved.

The current invention provides process cheeses comprising casein and whey protein with a ratio of casein to whey protein of from about 50:50 to about 75:25. In certain preferred embodiments, the ratio of casein to whey protein in the process cheese of the current invention is from about 60:40 to about 75:25. In other preferred embodiments, the ratio of casein to whey protein is about 60:40 to about 70:30. Typically, casein is present in the process cheese of this invention at a concentration of from about 8 to about 14 percent, and whey protein is present in the process cheese of this invention at a concentration of about 4 to about 8 percent. Typically, the process cheese further comprises an emulsifier, milkfat, and may contain one or more other ingredients such as, but not limited to, whole whey, cheese, and lactic acid. In certain embodiments, an ultrafiltered cheese is not used as an ingredient in the process cheese of the current invention. The process cheese of the current invention is preferably a process cheese food or process cheese sauce in the form of a loaf, slice, or sauce.

In certain preferred embodiments, the current invention provides methods for preparing process cheese in which milk protein, whey protein, milkfat, an emulsifier, and optionally one or more other ingredients such as, but not limited to, whole whey, cheese, and lactic acid, are combined to form a dairy emulsion. The dairy emulsion is then cooked to form a cooked emulsion, and cooled to form a process cheese. The process in these preferred embodiments includes a step wherein the dairy emulsion or the cooked emulsion are homogenized. The process cheese prepared by this method has a ratio of casein to whey protein of from about 50:50 to about 75:25. In preferred embodiments, the ingredients in the dairy emulsion provide a ratio of casein to whey protein of from about 55:45 to about 65:35 in the process cheese.

In certain embodiments, the current invention provides methods for preparing process cheese in which milk protein, whey protein, milkfat, an emulsifier, and optionally one or more other ingredients such as, but not limited to, whole whey, cheese, and lactic acid, are combined to form a dairy emulsion, wherein the milk protein and/or the whey protein are a modified dairy protein source. The modified dairy protein source includes high solubility milk protein, high viscosity whey protein, emulsified high fat whey protein, and low calcium whey protein. The dairy emulsion is then cooked to form a cooked emulsion, and cooled to form a process cheese. The process cheese prepared by this method has a ratio of casein to whey protein of from about 50:50 to about 75:25. In preferred embodiments, the ingredients in the dairy emulsion provide a ratio of casein to whey protein of from about 55:45 to about 70:30 in the process cheese. Using such a modified dairy protein sources, it is not necessary to homogenize the dairy emulsion or the cooked emulsion; if desired, however, such a homogenization step can be used. In a preferred embodiment of this method, the milk protein is high solubility milk protein concentrate or isolate; most preferably for this embodiment, the ratio of casein to whey protein is from about 55:45 to about 65:35. In another preferred embodiment of this method, the milk protein is high viscosity whey protein, preferably with a low calcium concentration; most preferably for this embodiment, the ratio of casein to whey protein is from about 65:35 to about 75:25. In another preferred embodiment of this method, the milk protein is emulsified high fat protein powder; most preferably for this embodiment, the ratio of casein to whey protein is from about 55:45 to about 70:30.

In certain embodiments, the current invention includes manipulating whey protein behavior in the process cheese system by altering the mineral composition of whey protein concentrates before they are dried. Whey protein concentrate (WPC) with specific mineral content (i.e., low calcium, low magnesium, and/or high sodium) can also be used to prepare a firm processed cheese product with increased whey protein content. In a preferred embodiment of the above method, the whey protein has a low calcium concentration.

In certain embodiments, the current invention is a product produced by any of the above-described methods.

BRIEF DESCRIPTION OF THE DRAWINGS

FIG. 3 provides a schematic diagram of a method of making process cheese according to Example 3 and using a pre-cook homogenization step.

FIG. 4 provides a schematic diagram of a method of making process cheese according to Example 4 and using a high solubility milk protein isolate.

Figure 1:
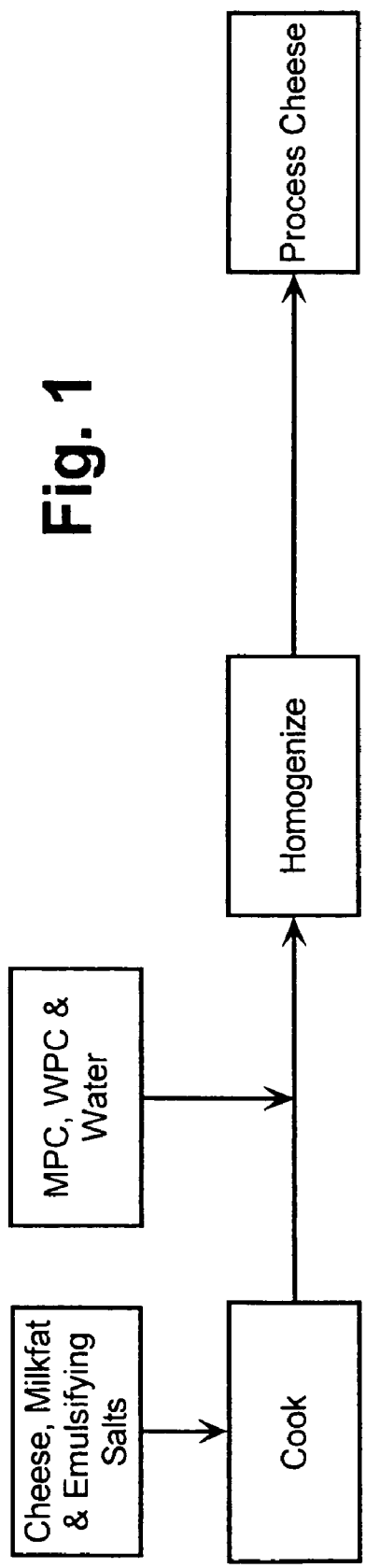
FIG. 1 provides a schematic diagram of a method of making process cheese according to Example 1 and using a post-cook homogenization step.

The abbreviations used in the Figures are as follows: "MPC" is milk protein concentrate; "WPC" is whey protein concentrate; and "MPI" is milk protein isolate.

DESCRIPTION OF THE PREFERRED EMBODIMENTS

Process Cheeses Containing Increased Whey Protein. The present invention provides a process cheese comprising casein and whey protein with a ratio of casein to whey protein of from about 50:50 to about 75:25. Typically, the process cheese further comprises an emulsifier, milkfat, and may contain one or more other ingredients such as, but not limited to, whole whey, cheese, and lactic acid. In certain preferred embodiments, the ratio of casein to whey protein is from about 60:40 to about 75:25. In other preferred embodiments, the ratio of casein to whey protein is about 55:45 to about 70:30. The ratio of casein to whey protein in the process cheese of the current invention can be measured by gel electrophoresis. The process cheese of the current invention is preferably in the form of a loaf, slice, or sauce.

Whey protein is added during production of the process cheese of the current invention. The whey protein used in this invention preferably is a whey protein concentrate (WPC) or other enriched whey protein preparations containing about 25 percent or more whey protein. Methods are well-known in the food sciences for producing enriched whey protein preparations. Furthermore, whey protein is commercially available (e.g., whey protein 34 (Wisconsin Whey International, Juda, Wis.), Proliant 8000 (Proliant, Inc., Ames Iowa). Preferably, whey protein sources of the current invention contain concentrated whey proteins. Preferably whey protein sources of the current invention have calcium levels at or below about 3000 ppm, referred to herein as low-calcium whey protein sources or concentrates. Typically, the process cheese of the current invention has about 4 to about 8 percent whey protein.

Virtually any enriched whey protein preparation known in the art may be utilized with the current invention provided that it provides appropriate levels of whey protein. Preferred whey protein preparations of the current invention generally have high viscosities. Suitable high viscosity whey protein preparations include, for example, Nollibel KLM (Pascobel Corp., Longueil, Quebec), Bravo 550 (Grande Ingredients Group, Lomira, Wis.), and DairyLo PC (Parmalat Canada, Etobicoke, Ontario).

As used herein, "whey protein" relates to the proteins contained in the dairy liquid (i.e., whey) obtained as a supernatant of the curds when milk or a dairy liquid containing milk components are curded to produce a cheese-making curd as a semisolid. Whey protein is generally understood to include principally the globular proteins β-lactoglobulin and α-lactalbumin. It may also include significantly lower concentrations of immunoglobulin and other globulins/albumins.

Casein is typically provided in the process cheese of the current invention by including milk protein in the process cheese formulation. Milk protein is preferably supplied by a highly enriched preparation of milk protein which contains less than about 30 percent of other milk components. Milk protein used in the current invention may be a milk protein concentrate or a milk protein isolate, for example. Milk protein concentrates, milk protein isolates, and other appropriate sources of milk proteins are well-known in the food sciences and are available commercially. Examples include ALAPRO 4700 and TMP 1220 (New Zealand Milk Products, Santa Rosa, Calif.) and Nutrilac CH7813 (Arla Foods Ingredients, Videbaek, Denmark). Typically, casein is present in the process cheese of the current invention at a concentration of from about 8 to about 14 percent. In certain preferred embodiments, milk protein concentrates make up about 5 to about 25 percent of the process cheese ingredients.

The milk protein used for the present invention may originate from any lactating livestock animal whose milk is useful as a source of human food. Such livestock animals include, by way of nonlimiting example, cows, buffalo, other ruminants, goats, sheep, and the like. Generally, however, cows' milk is the preferred dairy liquid used in the practice of the invention.

As used herein, "casein" relates to any, or all, of the phosphoproteins in milk, and to mixtures of these phosphoproteins. An important characteristic of casein is that it forms micelles in naturally occurring milk and in the dairy liquids employed in the present invention. Many casein components have been identified, including, but not limited to, α-casein (including $\alpha_{s1}$-casein and $\alpha_{s2}$-casein), β-casein, κ-casein, and their genetic variants.

As used herein a "concentrated protein source" is a protein source wherein proteins are at, or can be reconstituted to be at, a concentration that is greater than the dairy liquid from which they originated. Examples of concentrated dairy protein sources include, but are not limited to, whey protein concentrate and milk protein concentrate, or a combination of whey protein concentrate and milk protein concentrate. Typically, for whey protein concentrate and milk protein concentrate, protein concentrations are at least about 34 percent.

Typically, the process cheese further comprises an emulsifier. Suitable emulsifiers are well-known in process cheese formulations. For example, the emulsifier includes at least one of the following: inorganic salts including monosodium phosphate, disodium phosphate, dipotassium phosphate, trisodium phosphate, sodium metaphosphate, sodium acid pyrophosphate, tetra-sodium pyrophophate, sodium aluminum phosphate, sodium citrate, potassium citrate, calcium citrate, sodium tartrate, and sodium potassium tartrate. In process cheese, these emulsifying agents act as calcium chelating agents. In certain preferred embodiments, the emulsifier is a phosphate emulsifying salt. Appropriate concentrations of emulsifiers depend on the particular formulation of process cheese and can be determined using methods well known in food science. Typical concentration ranges for emulsifiers in process cheese are suitable for the current invention. In certain preferred embodiments, the emulsifier is present at a concentration of between about 2 and about 5 percent, preferably between 2.5 and 3.5 percent, and most preferably about 3 percent.

Typically, the process cheese of the current invention includes a source of fat, including animal and vegetables fats. The fat source is typically a dairy fat source, preferably milkfat. Milkfat concentration in the process cheese of the current invention varies depending on the desired qualities of the process cheese. In certain embodiments, the milkfat may comprise between about 5 and 30 percent of the process cheese, preferably between 10 and 25 percent. Milkfats are commercially available from numerous sources, as known in the art.

As mentioned above, the process cheese of the current invention may also contain whole whey. Whole whey is produced during traditional cheese production as is well known in the art, as are methods for isolating whole whey. In certain preferred embodiments, dried whey is used as the whey source. Methods for drying whey and commercially available sources of dry whey are well-known in the art. In certain preferred embodiments, dried whole whey is present at concentrations ranging from 0 to about 10 percent.

As mentioned above, the process cheese of the current invention may also contain cheese, and preferably a natural cheese, typically used for process cheese. Typically, as known in process cheese manufacturing, the cheese is melted before the ingredients of the process cheese are cooked. In certain preferred embodiments, the cheese is other than ultrafiltered cheese. When included in the process cheese, the amount of cheese varies depending on the specific qualities desired. For certain preferred embodiments, the cheese component is present at between 0 and about 45 percent, and more preferably at between about 15 to about 30 percent.

As mentioned above, the process cheese of the current invention may also contain lactic acid. In certain preferred embodiments, purified lactic acid in addition to that possibly found in other complex ingredients such as whey or cheese, is added during manufacture of the process cheese of the current invention. Concentrations of lactic acid added to the process cheese are ranges appropriate for standard process cheese. For example, lactic acid may be added at a concentration of between 0 and about 1 percent, preferably about 0.6 to about 0.7 percent.

Processes for Making Process Cheeses Containing Increased Whey Protein Using a Homogenization Step. In certain embodiments, the current invention provides methods for preparing process cheese described above, in which milk protein, whey protein, milkfat, an emulsifier, and optionally one or more other ingredients such as, but not limited to, whole whey, cheese, and lactic acid, are combined to form a dairy emulsion. The dairy emulsion is then cooked to form a cooked emulsion, and cooled to form a process cheese. These embodiments of the current invention include a step wherein the dairy emulsion and/or the cooked emulsion are homogenized. This homogenization step is important in providing acceptable firmness to a process cheese in which casein to whey protein ratios are below about 3:1.

Homogenization is used to create and/or maintain emulsions from the various liquids of the process and to maintain the various liquids in an emulsion state. Homogenization can be accomplished using conventional techniques and equipment well known in the food sciences. Homogenization is typically carried out at increased pressures. However, any effective homogenization method that can be used to homogenize dairy liquids can be used with embodiments of the current invention that include a homogenization step. For example, but not intended to be limiting, a two-stage homogenizer may be used. Two-stage homogenizers are well known in food manufacturing. Typically, the homogenization step is carried out at pressures between about 500 and about 6000 psi, and preferably between about 750 and 3000 psi.

Typically, after the ingredients of the process cheese are combined, they are mixed to form a uniform substantially homogeneous mixture before proceeding to subsequent steps. The processes of the current invention include a cooking step after the ingredients of the process cheese are combined. Typically, an emulsion is formed from these ingredients before they are cooked. The cooking step is performed using techniques and heating devices as are well-known in cheese manufacturing, and under conditions used in conventional process cheese manufacturing. For example, and not intended to be limiting, cooking may be carried out between about 150 and 200° F., most preferably, about 160 to about 180° F. In embodiments involving cheese as an ingredient, the cheese, possibly in combination with other ingredients, is heated to melt the cheese (e.g, about 160 to about 180° F.) before other ingredients are added. The temperature can then, if necessary, be increased to the desired cooking temperature.

The cooling and molding processes of the current invention are those known in process cheese manufacturing. For example, and not intended to be limiting, the process cheese may be poured into loaf or slice forms after the cooking step but before cooling. The process cheese of the current invention may be cooled using convention techniques and equipment as is well-known in process cheese manufacturing.

Processes for Making Process Cheeses Containing Increased Whey Protein Using a Modified Dairy Protein Source. In certain preferred embodiments, the milk protein source contains milk protein contained in a highly soluble form, as described in more detail below; in these embodiments, a homogenization step is not necessary. In these embodiments, the current invention provides methods for preparing process cheese with increased whey protein, as described above, in which milk protein, whey protein, milkfat, an emulsifier, and optionally one or more other ingredients such as, but not limited to, whole whey, cheese, and lactic acid, are combined to form a dairy emulsion, wherein at least one of the protein sources is a modified dairy protein source. Such modified dairy protein sources according to the current invention include high solubility milk protein, high viscosity whey protein, emulsified high fat whey protein, and low calcium whey protein. As discussed above, low calcium whey protein is a whey protein source in which calcium concentrations are at or below about 3000 ppm.

"High solubility milk protein" is milk protein in which proteins are more completely solubilized than in natural milk. Solubility can be measured as described in Morr et al., J. Food Sci., 50, 1715-18 (1985). Preferably, the milk protein in a high solubility milk protein material will be greater than about 90 percent solution as measured by the Morr et al. method. Such proteins are known in the art and include, for example Nutrilac CH7813 (Arla Food Ingredients, Videbaek, Denmark).

"High viscosity whey protein" is whey protein that is more resistant to flow than typical whey protein because the protein has been physically modified by methods known in the art. Such proteins are known in the art; examples include Nollibel KLM (Pascobel Corp., Longueil, Quebec), Bravo 550 (Grande Ingredients Group, Lomira, Wis.), and DairyLo PC (Parmalat Canada, Etobiicoke, Ontario).

"Emulsified high fat whey protein" is a fat stabilized by whey protein which is formed by preparing an emulsion of a dairy fat, whey protein, and water having an average particle size of about 0.5 to about 2 microns (preferably about 0.5 to about 1 microns) and which is then spray dried to form a powder. Preferably, the resulting powder has an average particle size of about 50 to about 400 microns. Preferably, the emulsified high fat whey protein contains about 40 to about 50 percent dairy fat, about 15 to about 20 percent whey protein, and about 1 to about 4 percent water. More preferably, this emulsion contains about 44 to about 46 percent dairy fat, about 18 to about 20 percent whey protein, and about 2 to about 3 percent water. The emulsified high fat whey protein can be employed in the present invention in the powder form or as reconstituted with an aqueous based liquid. This spray dried powder surprisingly has improved cheesemaking functionality as compared to the individual ingredients. When used to prepared the process cheese of the present invention, the emulsified high fat whey protein provides good firmness and melting characteristics. The emulsified high fat whey protein powder can also be used in other cheese-making processes.

Low calcium whey protein may be obtained using methods known in the art for altering free ion concentration in dairy liquids. For example, effective calcium concentrations can be lowered by adding a calcium-chelator, such as EDTA or EGTA, to a whey protein source. The chelator may, for example, be added to a final concentration of about 0.2 to about 1 percent. Suitable low calcium whey protein may be obtained commercially, including, for example, AMP80 (Proliant Inc., Ames, Iowa).

The dairy emulsion containing protein from the modified dairy protein source, is then cooked to form a cooked emulsion, and cooled to form a process cheese, as described above. Processes of the current invention which include a modified dairy protein source, may include a step wherein the dairy emulsion or the cooked emulsion are homogenized, as described above. Such homogenization is, however, not required in this embodiment of the invention.

The following examples describe and illustrate the processes and products of the invention. These examples are intended to be merely illustrative of the present invention, and not limiting thereof in either scope or spirit. Unless indicated otherwise, all percentages and ratios are by weight. Those skilled in the art will readily understand that variations of the materials, conditions, and processes described in these examples can be used. All references cited herein are incorporated by reference in their entireties. In the examples that follow, firmness was determined using a penetrometer (Precision Scientific Universal Penetrometer with a 41.3 g aluminum cone; softening points were determined using a Mettler FP-83 Dropping Point Furnace and Mettler FP-80 Processor; casein and whey protein concentrations were determined using gel electrophoresis; and calcium was determined using inductively coupled plasma spectroscopy. Good quality process cheese generally has a penetrometer firmness of about 10 to about 20 mm and a softening or melting point of about 105 to about 150° F.

Example 1

Production of a Process Cheese with High Whey Protein Concentration Using a Post-Cooking Homogenization Step. This example provides a process cheese with high whey protein concentration as prepared by the method of the current invention as illustrated in FIG. 1. Cheddar cheese (18 lbs) and 8.8 lbs milkfat were combined in a cooker and melted with 1.9 lbs of phosphate emulsifying salts. After melting the cheese at 160° F., a slurry of 5 lbs milk protein concentrate (Alapro 4700; New Zealand Milk Products, Santa Rosa, Calif.) and 9.7 lbs whey protein concentrate (WPC34, Wisconsin Whey International, Juda, Wis.) in 16 lbs water was added and cooked to 175° F. for about 4 minutes. The cooked emulsion was homogenized in a 2-stage homogenizer (first stage at 500 psi and second stage at 250 psi), poured into loaf forms and cooled. Control samples were processed as above except that the cooked emulsion was not homogenized.

Cheese prepared as described above with high whey protein concentrations and homogenization had acceptable firmness and softening point. The resulting loaf of the above process had a penetrometer firmness of 14 mm and a softening point of 130° F. This was well below the target penetrometer value of less than 20 mm for acceptable firmness, despite the fact that the casein to whey protein ratio of the finished product was well-below 3:1. The control sample had unacceptable firmness (i.e., a penetrometer firmness of 32 mm) and a softening point of 110° F.

Example 2

Figure 2:
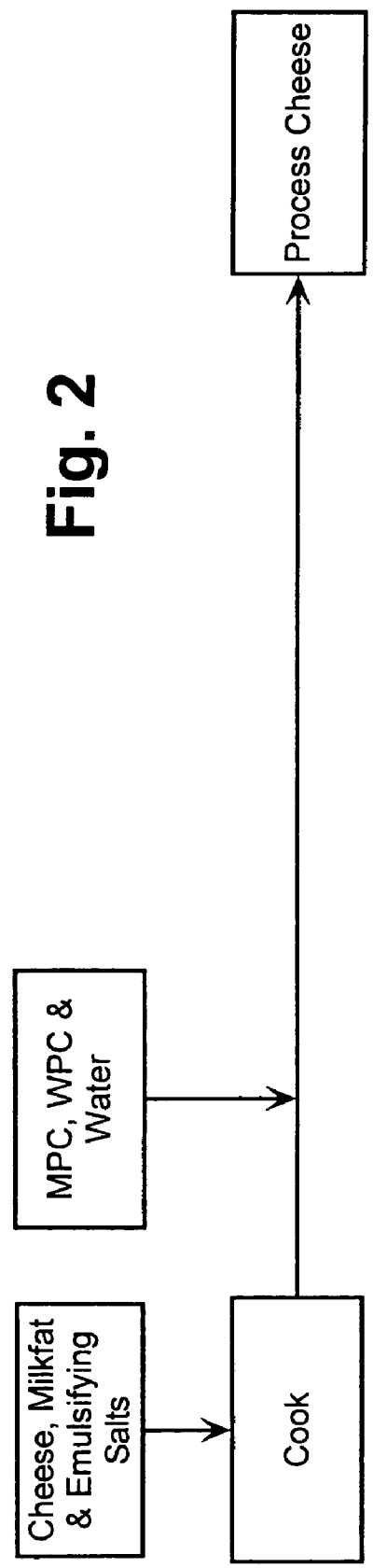
FIG. 2 provides a schematic diagram of a method of making process cheese according to Example 2 and using high solubility milk protein concentrate.

Production of a Process Cheese with High Whey Protein Concentration Using High Solubility Milk Protein Concentrate. This example provides a process cheese with high whey protein concentration as prepared by the method of the current invention as illustrated in FIG. 2. Cheddar cheese (10.5 lbs) and 11.3 lbs milkfat were combined in a cooker and melted with 1.9 lbs of phosphate emulsifying salts.

After melting the cheese at 160° F., a slurry of 6.8 lbs high solubility milk protein concentrate (Nutrilac CH7813, Aria Foods Ingredients, Videbaek, Denmark) and 10.7 lbs whey protein concentrate (WPC34, Wisconsin Whey International, Juda, Wis.) in 23.5 lbs water was added and cooked to 175° F. for about 4 minutes. The cooked emulsion was poured into loaf forms and cooled.

Control process cheese was prepared using normal milk protein concentrate instead of high solubility milk protein concentrate, according to a procedure that was otherwise virtually identical to that used for the processed sample above. The control process cheese was made using the following process: 10.5 lbs cheese (as described above) and 11.4 lbs milkfat were combined in a cooker and melted with 1.9 lbs of phosphate emulsifying salts. After melting the cheese at 160° F., a slurry of 7.3 lbs milk protein concentrate (Alapro 4700; New Zealand Milk Products, Santa Rosa, Calif.) and 10.1 lbs whey protein concentrate (WPC34, Wisconsin Whey International, Juda, Wis.) in 23.5 lbs water was added and cooked to 175° F. for about 4 minutes. The cooked emulsion was poured into loaf forms and cooled.

Cheese prepared as described above with high whey protein concentrations and high solubility milk protein concentrate had acceptable firmness and softening point. The resulting loaf has a penetrometer firmness of 19 mm and a softening point of 135° F. The casein to whey protein ratio of the finished product was 56:44 as measured by gel electrophoresis. The firmness of 19 mm was below the target penetrometer value of less than 20 mm for acceptable firmness, despite the fact that the casein to whey protein ratio of the finished product was well-below 3:1. The control sample had unacceptable firmness (i.e., a penetrometer firmness of 32 mm) and a softening point of 108° F.

Example 3

Production of a Process Cheese with High Whey Protein Concentration Using Homogenization After Emulsion Formation. This example provides a process cheese with high whey protein concentration as prepared by the method of the current invention as illustrated in FIG. 3. An emulsion containing 11.3 lbs milk protein concentrate (Alapro 4700; New Zealand Milk Products, Santa Rosa, Calif.), 9.1 lbs whey protein concentrate (WPC34, Wisconsin Whey International, Juda, Wis.), 27 lbs water, and 15 lbs milkfat was mixed in a high shear mixer and homogenized in a 2 stage homogenizer (first stage at 2500 psi and second stage at 500 psi). The emulsion was transferred into a cooker and cooked to 175° F. for about 4 minutes with 1.9 lbs added phosphate emulsifying salts. The cooked emulsion was poured into loaf forms and cooled. A control sample was prepared as above, except the homogenization step was omitted.

Cheese prepared as described above with high whey protein concentrations and homogenization step after emulsification had acceptable firmness and softening point. The resulting loaf has a penetrometer firmness of 15 mm and a softening point of 147° F. The casein to whey protein ratio of the finished product is 62:38 as measured by gel electrophoresis. The firmness was well below the target penetrometer value of less than 20 mm, despite the fact that the casein to whey protein ratio of the finished product was significantly below 3:1. The non-homogenized control sample had unacceptable firmness (i.e., a penetrometer firmness of 25 mm) and a softening point of 115° F.

Example 4

Production of a Process Cheese with High Whey Protein Concentration Using High Solubility Milk Protein Isolate and Emulsion Formation. This example provides a process cheese with high whey protein concentration as prepared by the method of the current invention as illustrated in FIG. 4. An emulsion containing 9.4 lbs high solubility milk protein isolate (TMP 1220, New Zealand Milk Products, Santa Rosa, Calif.), 8.2 lbs whey protein concentrate (WPC34, Wisconsin Whey International, Juda, Wis.), 2.3 lbs dried sweet whey (Krafen, Kraft Foods, Glenview, Ill.), 27 lbs water, 0.44 lbs lactic acid, and 15 lbs milkfat was mixed in a high shear mixer. The mixture was transferred into a cooker and cooked to 175° F. with 1.9 lbs added phosphate emulsifying salts for about 4 minutes. The cooked emulsion was poured into loaf forms and cooled.

A control process cheese was prepared using normal milk protein concentrate according to the following procedure: An emulsion containing 11.2 lbs milk protein concentrate (Alapro 4700; New Zealand Milk Products, Santa Rosa, Calif.), 9.1 lbs whey protein concentrate (WPC34, Wisconsin Whey International, Juda, Wis.), 27.2 lbs water, 0.44 lbs lactic acid and 15 lbs milkfat was mixed in a high shear mixer. The mixture was transferred into a cooker and cooked to 175° F. with 1.9 lbs added phosphate emulsifying salts. The cooked emulsion was poured into loaf forms and cooled.

Cheese with high whey protein concentrations prepared as described above with high solubility milk protein concentrate had acceptable firmness and softening point. The resulting loaf has a penetrometer firmness of 17 mm and a softening point of 130° F. The casein to whey protein ratio of the finished product is 60:40 as measured by gel electrophoresis. The firmness of 17 mm was well below the target penetrometer value of less than 20 mm for acceptable firmness, despite the fact that the casein to whey protein ratio of the finished product was significantly below 3:1. The non-homogenized control sample had unacceptable firmness (i.e., a penetrometer firmness of 23 mm) and a softening point of 118° F.

Example 5

Figure 5:
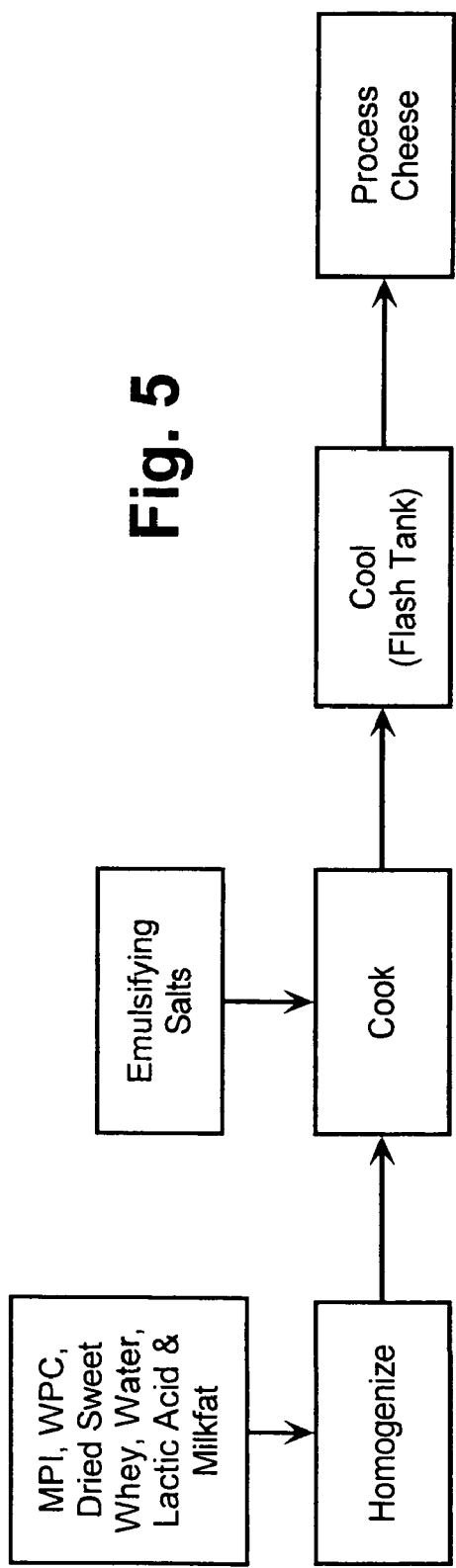
FIG. 5 provides a schematic diagram of a method of making process cheese according to Example 5 and using a pre-cook homogenization step.

Production of a Process Cheese with High Whey Protein Concentration and Pre-cook Homogenization. This example provides a process cheese with high whey protein concentration as prepared by the method of the current invention as illustrated in FIG. 5. An emulsion containing 13.7 lbs milk protein concentrate (Alapro 4700; New Zealand Milk Products, Santa Rosa, Calif.), 2.4 lbs whey protein concentrate (WPC34, Wisconsin Whey International, Juda, Wis.), 3.9 lbs dried sweet whey (Krafen, Kraft Foods, Glenview, Ill.), 0.44 lbs lactic acid, 27 lbs water, and 15 lbs milkfat was mixed in a high shear mixer and homogenized in a 2 stage homogenizer (first stage at 2500 psi and second stage at 500 psi). The emulsion was transferred into a cooker and cooked to 175° F. with 1.9 lbs added phosphate emulsifying salts for about 4 minutes. The cooked emulsion was cooled in a flash tank and formed into slices and loaves.

Cheese with high whey protein concentrations prepared as described above with the homogenization step had acceptable firmness and softening point. The resulting loaf has a penetrometer firmness of 9 mm and a softening point of 130° F. The casein to whey protein ratio of the finished product is 73:27 as measured by gel electrophoresis. The firmness of 9 mm was well below the target penetrometer value of less than 20 mm for acceptable firmness, despite the fact that the casein to whey protein ratio of the finished product was significantly below 3:1.

Example 6

Production of a Process Cheese with High Whey Protein Concentration Using Modified High Viscosity Whey Protein Concentrate. This example provides a process cheese with high whey protein concentration as prepared by the method of the current invention. Cheddar cheese and 6.6 lbs milkfat were combined in a cooker and melted with 1.9 lbs of phosphate emulsifying salts. After melting the cheese at 160° F., a slurry of 4.0 lbs milk protein concentrate (Alapro 4700; New Zealand Milk Products, Santa Rosa, Calif.), 6.3 lbs high viscosity whey protein concentrate (WPC34, Wisconsin Whey International, Juda, Wis.), and 2.8 lbs dried sweet whey (Krafen, Kraft Foods, Glenview, Ill.) in 15 lbs water was added to the cheese and cooked to 175° F. for about 4 minutes. The cooked emulsion was poured into loaf forms and cooled. A control process cheese was prepared according to the method described above using normal whey protein concentrate in place of high viscosity whey protein concentrate.

Cheese with high whey protein concentrations prepared as described above using high viscosity whey protein concentrate had acceptable firmness and softening point. The resulting loaf has a penetrometer firmness of 19 mm and a softening point of 110° F. The casein to whey protein ratio of the finished product was 70:30 based on the composition of the ingredients. The firmness of 19 mm was below the target penetrometer value of less than 20 mm for acceptable firmness, despite the fact that the casein to whey protein ratio of the finished product was significantly below 3:1. The control sample had unacceptable firmness (i.e., a penetrometer firmness of 25 mm) and a softening point of 108° F.

Example 7

Production of a Process Cheese with High Whey Protein Concentration and Whey Protein Concentrates with Varying Calcium Concentrations. This example provides a process cheese with high whey protein concentration and varying calcium concentrations in whey protein concentrate used to make the process cheese using a standard process cheese protocol. A series of process cheeses were prepared using the following procedure: 26.2 lbs cheese and 6.6 lbs milkfat were combined in a cooker and melted with 1.9 lbs of phosphate emulsifying salts. After melting the cheese at 160° F., a slurry of 4.0 lbs milk protein concentrate (Alapro 4700; New Zealand Milk Products, Santa Rosa, Calif.), 6.3 lbs whey protein concentrate (with varying concentrations of calcium as indicated below and in FIG. 6) and 2.8 lbs dried sweet whey (Krafen, Kraft Foods, Glenview, Ill.) in 15 lbs water was added and cooked to 175° F. for about 4 minutes. The cooked emulsion was poured into loaf forms and cooled.

The whey protein concentrates used for this experiment were as follows: AMP 80 (Proliant, Inc., Ames, Iowa), calcium concentration 2620 ppm; AMP 800 (Proliant, Inc., Ames, Iowa), calcium concentration 3020 ppm; Calpro 8002 (Calpro Ingredients, Corona, Calif.), calcium concentration 3710 ppm; Cal 80 (Calpro Ingredients, Corona, Calif.), calcium concentration 4160 ppm; Cal 8001 (Calpro Ingredients, Corona, Calif.), calcium concentration 4470 ppm; and AMP 8000 (Proliant, Inc., Ames, Iowa), calcium concentration 4890 ppm.

Figure 6:
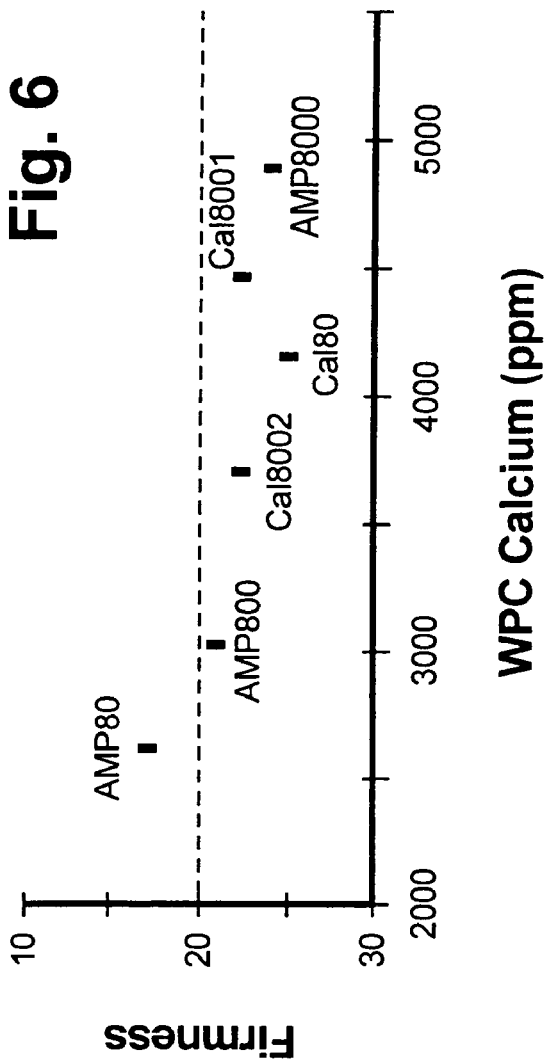
FIG. 6 is a graph showing firmness (penetrometer values) for process cheeses made with whey protein concentrates with various concentrations of calcium. Labels of the points on the graph refer to the specific product names of the WPCs. The process cheese for this experiment was 47 percent cheese and had a casein to whey ratio of 73:23.

Cheese with high whey protein concentrations prepared using whey protein concentrates with less than 3000 ppm calcium had acceptable firmness and softening point. The casein to whey protein ratio of the finished product was 73:27 based on the composition of the ingredients. Despite the fact that this ratio was less than the previously described limit of 3:1, as the calcium content of the WPC80 decreased from 4890 ppm to 2620 ppm, the firmness of the resulting process cheese loaf increased to acceptable levels, as seen by the penetrometer penetration decrease from 24 to 17 (FIG. 6). As in previous Examples, a firmness below 20 is desired. Therefore, process cheese made with whey protein concentrates having a calcium content below 3000 ppm results in process cheese with acceptable firmness, despite having a casein to whey protein ratio less than 3:1.

Example 8

Production of a Process Cheese using Emulsified High Fat Whey Protein. Whey protein concentrate (50 kg), water (180 kg), and cream (103 kg; 42% fat) were mixed and then homogenized in a two-stage homogenizer (2500 psi first stage, 250 psi second stage) at about 117° F. and a flow rate of about 2.8 l/min. The resulting emulsion had an average fat particle size of about 1 micron. The emulsion was immediately spray dried using a multistage spray drier (145 l/hr, nozzle pressure 2500 psi, air inlet at about 500° F., air outlet at about 200° F.). The resulting emulsified high fat whey protein powder had about 2.6 percent moisture, about 19.5 percent protein, about 45.4 percent fat, about 28.4 percent lactose, and about 4.1 percent ash.

Short-hold cheddar cheese (10.5 lbs) and anhydrous milkfat (4 lbs) were blended in a ribbon blender. The emulsified high fat whey protein powder (in the form of a slurry formed from 17 lbs powder in about 23 lbs water), milk protein concentrate AMP 80 (6.6 lbs; Proliant, Inc., Ames, Iowa), dried whey (1.2 lbs; Krafen, Kraft Foods, Glenview, Ill.), and water (23 lbs) were mixed in a high shear mixer and then added to the cheese/fat mixture in the ribbon blender; blending was continued until a homogenous mixture was obtained. The homogenous mixture was transferred to a 70 lb laydown cooker and cooked to 175° F. for about 4 minutes with the addition of about 2.7 lbs phosphate emulsifying salts and about 1.7 lbs salt. After cooking, the molten cheese mass was poured into loaf molds and refrigerated. After about 1 week refrigerated storage, the resulting process cheese had a penetrometer firmness of about 15.3 mm and a softening or melting point of about 132° F.

For comparison purposes, a conventional process cheese was prepared using the individual components of the emulsified high fat whey protein powder rather than the emulsified high fat whey protein powder itself. Short-hold cheddar cheese (10.5 lbs) and anhydrous milkfat (11.5 lbs) were blended in a ribbon blender. A slurry of whey protein concentrate 35 (9.5 lbs), milk protein concentrate 80 (6.6 lbs), dried whey (1.2 lbs), lactic acid (0.32 lbs), and water (23.1 lbs) were mixed in a high shear mixer and then added to the cheese/fat mixture in the ribbon blender; blending was continued until a homogenous mixture was obtained. The homogenous mixture was transferred to a 70 lbs laydown cooker and cooked to 175° F. with the addition of about 2.7 lbs phosphate emulsifying salts and about 1.7 lbs salt. After cooking, the molten cheese mass was poured into loaf molds and refrigerated. The resulting control, after 1 week refrigerated storage, had a penetrometer firmness of about 20.1 mm and a softening or melting point of about 121° F. This control process cheese was too soft.

What is claimed is:

1. A process cheese comprising casein and whey protein and an emulsifier with a ratio of casein to whey protein of from about 50:50 to about 75:25, wherein the process cheese has a penetrometer firmness of about 10 to about 20 mm and a melting point of about 105 to about 150° F.

2. The process cheese of claim 1, further comprising milkfat and one or more ingredients selected from whole whey, cheese, and lactic acid.

3. The process cheese of claim 1, wherein the ratio of casein to whey protein in the process cheese is from about 60:40 about 75:25.

4. The process cheese of claim 1, wherein the ratio of casein to whey protein is from about 60:40 to about 70:30.

5. The process cheese of claim 2, wherein the ratio of casein to whey protein in the process cheese is from about 60:40 to about 75:25.

6. The process cheese of claim 2, wherein the ratio of casein to whey protein is from about 60:40 to about 70:30.

7. A process cheese comprising:
   a homogenized emulsion of casein and whey protein with a ratio of casein to whey protein from about 1:1 to about 3:1;
   wherein the process cheese has a penetrometer firmness of about 10 to about 20 mm and a melting point of about 105 to about 150° F.; and
   an emulsifier, milkfat, and one or more ingredients selected from whole whey, cheese, and lactic acid.

8. The process cheese of claim 7, comprising about 15 to about 35 percent cheese, about 10 to about 20 percent added fat, about 2.75 to about 3.25 percent emulsifier, about 5 to about 20 percent milk protein concentrate, and about 10 to about 20 percent whey protein concentrate.

9. The process cheese of claim 7, comprising about 15 to about 25 percent added fat, about 2.75 to about 3.25 percent emulsifier, about 0.5 to about 1.0 percent lactic acid, about 5 to about 20 percent milk protein concentrate, and about 10 to about 20 percent whey protein concentrate.

10. The process cheese of claim 9, further comprising about 2 to about 10 percent whole whey.

\* \* \* \* \*

UNITED STATES PATENT AND TRADEMARK OFFICE
CERTIFICATE OF CORRECTION

PATENT NO. : 7,709,037 B2 Page 1 of 1
APPLICATION NO. : 10/694960
DATED : May 4, 2010
INVENTOR(S) : Isabelle Laye et al.

It is certified that error appears in the above-identified patent and that said Letters Patent is hereby corrected as shown below:

Column 12, line 65, after "60:40" insert --to--.

Signed and Sealed this

Twenty-seventh Day of July, 2010

David J. Kappos
*Director of the United States Patent and Trademark Office*